US010264457B2

(12) United States Patent
Peterson et al.

(10) Patent No.: US 10,264,457 B2
(45) Date of Patent: Apr. 16, 2019

(54) WIRELESS NETWORK ACCESS FOR SOCIAL NETWORK CONNECTIONS

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/673,202

(22) Filed: Mar. 30, 2015

(65) Prior Publication Data

US 2016/0295412 A1 Oct. 6, 2016

(51) Int. Cl.
*H04W 12/08* (2009.01)
*H04W 4/02* (2018.01)
*H04W 84/12* (2009.01)
*H04W 76/38* (2018.01)

(52) U.S. Cl.
CPC ............ *H04W 12/08* (2013.01); *H04W 4/02* (2013.01); *H04W 76/38* (2018.02); *H04W 84/12* (2013.01)

(58) Field of Classification Search
CPC ....... H04L 63/08; H04L 63/083; G06F 21/62; H04W 12/08
See application file for complete search history.

(56) References Cited

U.S. PATENT DOCUMENTS

| | | | |
|---|---|---|---|
| 2006/0019664 A1* | 1/2006 | Nelakanti | H04W 36/14 455/436 |
| 2010/0015926 A1* | 1/2010 | Luff | H04L 41/0604 455/67.13 |
| 2010/0291906 A1* | 11/2010 | DeLuca | H04M 3/2281 455/414.1 |
| 2014/0150067 A1* | 5/2014 | Salkintzis | H04L 67/24 726/4 |
| 2015/0200925 A1* | 7/2015 | Lagerstedt | H04L 63/062 726/6 |
| 2015/0327060 A1* | 11/2015 | Gilson | H04L 67/16 726/7 |
| 2015/0350910 A1* | 12/2015 | Eramian | H04W 12/08 726/6 |

* cited by examiner

*Primary Examiner* — Kamran Afshar
*Assistant Examiner* — Farideh Madani
(74) *Attorney, Agent, or Firm* — Kunzler, PC (57) ABSTRACT

For automatically providing wireless network access to a guest, a method includes identifying an authorized guest of a provider of a wireless network, determining a distance between the authorized guest and the wireless network, and providing an access credential to the authorized guest in response to the authorized guest being within a predetermined distance of the wireless network. Identifying an authorized guest of the provider may include accessing a social networking account of the provider and identifying a social network connection of the provider from the social networking account, wherein the authorized guest is a social network connection of the provider. The wireless network may be a secured wireless network, wherein the access credential includes a wireless network identifier and a password for the secured wireless network.

20 Claims, 6 Drawing Sheets

Access Credential

| Access Point ID 205 |
| --- |
| Security/Encryption Type 210 |
| Security/Encryption Value 215 |
| Access Point Location (optional) 220 |
| Expiration Parameter (optional) 225 |

Access Point Information

| Access Point ID 205 |
| --- |
| Access Point Location 220 |
| Provider ID 235 |
| Guest List 240 |
| Access Credential (optional) 200 |

WIRELESS NETWORK ACCESS FOR SOCIAL NETWORK CONNECTIONS

BACKGROUND

Field

The subject matter disclosed herein relates to wireless network access and more particularly relates to automatically providing wireless network access for a social network connection.

Description of the Related Art

A wireless access point grants access to a wireless network to a user having appropriate access settings, such as a network name and password. In order for a user to temporarily get connected to their friend's wireless access point, the friend has to give the user their password or some other, generally permanent, form of access. If the person gets a new wireless access point, or changes their network name or password, they'll need to give out this information all over again to their friends who had previously connected to the person's wireless network.

BRIEF SUMMARY

An apparatus for automatically providing wireless network access to an authorized guest is disclosed. A method and computer program product also perform the functions of the apparatus. The apparatus includes a processor and a memory that stores code, executable by the processor, including code that: generates wireless access settings for a wireless access point, identifies a social network connection of a provider of the wireless access point, and downloads wireless access settings for the wireless access point to a mobile device of the social network connection.

In certain embodiments, identifying a social network connection of the provider includes accessing a social network profile of the provider and downloading a list of social network connections from the social network profile. In certain embodiments, downloading the wireless access settings includes identifying a geographic location for the social network connection and downloading the wireless access settings in response to the social network connection being within a predetermined distance of the wireless access point, wherein the predetermined distance is greater than the coverage range of the wireless access point. Identifying the geographic location of the social network connection may include querying a social network provider for the geographic location of the social network connection.

In certain embodiments, generating the wireless access settings includes receiving access point settings from the provider and generating wireless access settings for the wireless access point based on the received access point settings. Generating wireless access settings may optionally include creating an expiration time property field that triggers deletion of the wireless access settings at a time indicated by the expiration time property field. Generating wireless access settings may optionally include creating a temporary wireless network identifier valid for a predetermined time period, the wireless access settings including the temporary wireless network identifier and a password. In some embodiments, the wireless access settings expire after a predetermined time period, and the apparatus further includes code that: updates the wireless access settings, in response to expiration of the predetermined time period and issues the updated wireless access settings to the social network connection.

The method includes identifying an authorized guest of a provider of a wireless network, determining a distance between the authorized guest and the wireless network, and providing an access credential to the authorized guest in response to the authorized guest being within a predetermined distance of the wireless network.

In some embodiments, the method also includes: receiving wireless network settings for a wireless network from the provider and generating the access credential based on the wireless network settings. The method may further include: receiving an updated access credential for the wireless network from the provider, generating a new access credential based on the received updated access credential, and providing the new access credential to each authorized guest within the predetermined distance of the wireless network.

In certain embodiments, identifying an authorized guest of the provider includes accessing a social networking account of the provider and identifying a social network connection of the provider from the social networking account, wherein the authorized guest is a social network connection of the provider. In other embodiments, identifying an authorized guest of the provider may include accessing a list of authorized guests, wherein determining the distance between the authorized guest and the wireless network comprises querying a location server for the geographic location of the authorized guest.

In certain embodiments, the wireless network is a secured wireless network, and wherein the access credential comprises a wireless network identifier and a password for the secured wireless network. In certain embodiments, the predetermined distance is based on a number of social network connection of the provider and/or a coverage area of the wireless network.

The program product comprising a computer readable storage medium that stores code executable by a processor, the executable code comprising code to perform: generating an access credential for a wireless network, identifying an authorized guest of a provider of the wireless network, determining a distance between the authorized guest and an access point of the wireless network, and issuing the access credential to the authorized guest in response to the authorized guest being within a predetermined distance of the wireless network access point.

In certain embodiments, generating an access credential for a wireless network comprises receiving login information for the wireless network from the provider. In certain embodiments, the wireless network comprises a wireless local area network, and wherein issuing the access credential to the authorized guest comprises sending the access credential over a separate wireless network.

In certain embodiments, identifying an authorized guest of the provider comprises: accessing a social networking account of the provider and identifying a social network connection of the provider from the social networking account, wherein the authorized guest is a social network connection of the provider. In certain embodiments, the wireless network is a secured wireless network, and wherein the access credential comprises a wireless network identifier and a password for the secured wireless network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed embodiments simplify the process of getting login info for a wireless network by providing wireless network access to a guest by sending wireless network access settings to a device belonging to a friend, family member, customer, or other guest for wireless network provider. For example, the wireless network may be a Wi-Fi® or other wireless local area network (WLAN) at a user's home or place of business. This is especially useful when an individual visits a friend or family member.

In some embodiments, social networking is employed to identify a guest to whom the user desires to grant wireless network access. For example, the user may add and/or remove social networking friends (e.g., connections) to a wireless network "friend circle." If a person is in a "friend circle" associated with the wireless network, their device may download the wireless network access settings for connecting to the wireless network. In some embodiments, the wireless network access settings are downloaded when the device is within proximity of the wireless network (e.g., when a friend is within proximity of the user's house).

In certain embodiments, the wireless network access settings are not permanently stored on the friend's device, rather the settings may only reside on the device while the device is within proximity of the wireless network boundaries. In other embodiments, the wireless network access settings are temporary and expire after predetermined time period, wherein a guest within proximity of the wireless network may automatically receive updated wireless network access settings.

Wireless network access settings may include a network name (e.g., a service set identifier (SSID)), security credentials (e.g., a password or a security token). These wireless network settings may be automatically transferred to a guest's mobile device (e.g., smartphone or other mobile phone) on demand so that there is no need for the user to give out the settings and for the guest to manually enter the settings into the mobile device. Further, if the wireless network access settings change (e.g., new wireless access point, new network name, or new password), then there is no need to give out the new settings each guest visiting the user.

In one example, the user may operate a physical store with an online presence (e.g., a social networking account or profile associated with the store) and that provides wireless network service to patrons (e.g., guests) at its physical store. Conventionally, providing wireless network service to a large number of patrons would require an open (e.g., unsecured) wireless access point. However, the disclosed embodiments allow a social network connection (e.g., a FACEBOOK® friend or TWITTER® follower) to receive the wireless network access settings when they are within proximity of the store. This way, the user may automatically provide wireless network access to anyone that FACE-BOOK® friends the store.

While the disclosed embodiments are described in connection with social networking services, the authorized guest does not need to be a social network connection. In general, the disclosed embodiments apply any situation where a wireless network provider agrees to automatically provide recurring access to one or more guest devices and the device agrees to provide location updates to a server that manages device access. In one embodiment, the person owning the wireless access point and his or her guests may be the users of an application (e.g., mobile application) for connecting users and for automatically providing wireless network access to a user's guests who also use the application. In one embodiment, an application user may determine that it is in proximity to a wireless access point of another user and may automatically request wireless network access settings for the wireless access point if the application user's device is within proximity of the wireless access point.

Figure 1:
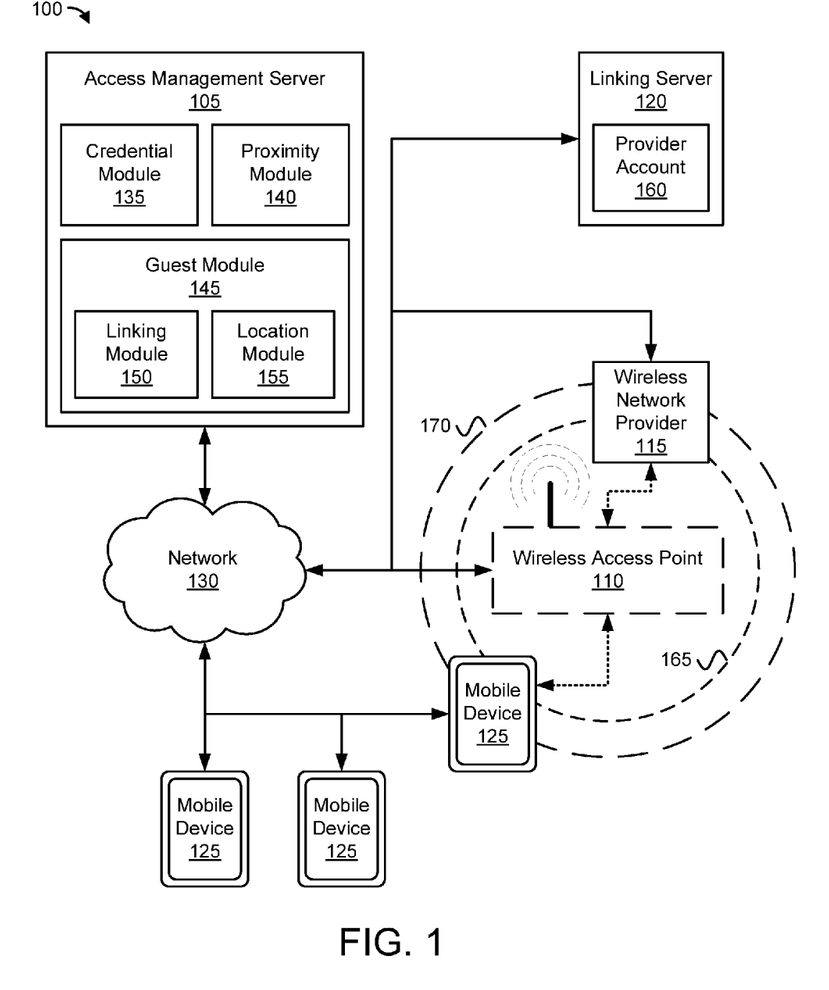
FIG. 1 is a schematic block diagram illustrating one embodiment of a system for automatically providing wireless network access to a guest.

FIG. 1 depicts a system 100 for automatically providing wireless network access to a guest, according to embodiments of the disclosure. The system 100 includes an access manager 105, at least one wireless access point (AP) 110, a wireless network provider 115, a linking server 120, a plurality of mobile devices 125, and a data network 130. The data network 130 may be the Internet, a local area network, a wide-area network, a mobile telephone network, or combinations thereof.

The access manager 105, in one embodiment, is configured to identify an authorized guest of the wireless network provider 115 and provide an access credential to a wireless network (e.g., the wireless AP 110) of the wireless network provider 115. In some embodiments, the access manager 105 determines a distance between the authorized guest and the wireless network (e.g., the wireless AP 110) and provides an access the authorized guest in response to the authorized guest being within a predetermined distance of the wireless network. The access manager 105 may comprise hardware, firmware, software, or combinations of the same. In some embodiments, the access manager 105 comprises a server, or another computing device, connected to the wireless AP 110 via the data network 130. In one embodiment, the access manager may be co-located with the wireless AP 110. In another embodiment, the access manager 105 may be a part of a social networking server. In yet another embodiment, the access manager 105 may be a component a mobile device 125 of the wireless network provider 115.

In certain embodiments, the access manager 105 includes one or more of: a credential module 135, a proximity module 140, and a guest module 145. The access manager 105 may also store data relating to one or more wireless APs 110, such as identifiers, passwords, and other access settings. In some embodiments, the access manager 105 may store an access credential used by a mobile device 125 to access the wireless AP 110. In some embodiments, the access manager 105 may store a guest list associated with a wireless network provider 115, the guest list describing authorized guests of the wireless network provider 115. In a further embodiment, the access manager 105 may store associations between authorized guests and mobile devices 125.

The credential module 135, in one embodiment, is configured to generate and store an access credential based on wireless AP 110 settings received from the wireless network provider 115. The access credential may be transmitted to one or more authorized guests, in response to the authorized guest(s) meeting one or more proximity criteria. In some embodiments, the access credential is associated with a time limit, wherein the access credential expires and is deleted when the time limit is met.

As used herein, an authorized guest refers to a person to whom the wireless network provider 115 desires to grant access to the wireless AP 110. The authorized guest accesses the wireless AP 110 via an electronic device, such as a mobile device 125. In some embodiments, an authorized guest may be associated with a plurality of electronic devices. For example, an authorized guest may possess a cellular telephone (e.g., a smartphone) and a portable computer (e.g., a laptop computer), both of which are capable of accessing the wireless AP 110.

As used herein, transmitting, downloading, or otherwise communicating data to an authorized guest, such as an access credential, refers to transmitting said data to the electronic device of the authorized guest. Where an authorized guest is associated with a plurality of electronic devices, passing data to the authorized guest includes transmitting said data to each electronic device associated with the authorized guest. In the above example, the access manager 105 may transmit an access credential to both the cellular telephone and the portable computer of the authorized guest.

The proximity module 140, in one embodiment, is configured to monitor a location of an authorized guest (e.g., the location of a mobile device 125) and compare the guest's location to the location of the wireless AP 110. In some embodiments, the proximity module 140 calculates a distance between the authorized guest and the wireless AP 110. In response to the authorized guest's location meeting predefined proximity criteria (e.g., being within a predefined distance of the wireless AP 110), the proximity module 140 may transmit an access credential to the authorized guest. Alternatively, the proximity module 140 may instruct the credential module 135 to transmit the access credential to the authorized guest, in response to the distance meeting the predefined proximity criteria.

As used herein, a location of an authorized guest refers to the geographic location of said guest. In some embodiments, the location of the authorized guest corresponds to a geographic location of an electronic device associated with the authorized guest. For example, an authorized guest's location may correspond to the geographic location of said guest's mobile device 125, such as a smartphone. In other embodiments, the location of the authorized guest may correspond to a geographic location of a network location. For example, an authorized guest's location may correspond to a physical location of a wireless local area network (WLAN) or a mobile (cellular) network tower to which the guest's mobile device 125 is connected. As another example, the authorized guest's location may correspond to a physical location associated with an Internet Protocol (IP) address of the guest's mobile device 125. Where an authorized guest is associated with a plurality of electronic devices, said guest may be associated with a plurality of locations, each location corresponding to an electronic device.

In some embodiments, the proximity module 140 receives the authorized guest location directly from the authorized guest (e.g., directly from a mobile device 125). For example, proximity module 140 may receive regular location updates from a mobile device 125 of the authorized guest. In other embodiments, the proximity module 140 receives the guest location from a third party, such as a location server or the linking server 120. The proximity module 140 calculates a distance between the received guest location and the location of the wireless AP 110, and compares the result to the predefined proximity criteria.

The proximity criteria may define a delivery area 170 surrounding the wireless AP 110, wherein the access credential is downloaded to an authorized guest located within the delivery area. In some embodiments, the delivery area 170 comprises a circular area surrounding the wireless AP 110, wherein the access manager 105 delivers the access credential in response to the distance between the authorized guest and the wireless AP being less than the radius of the delivery area 170. In other embodiments, the delivery area 170 is a polygonal area surrounding the wireless AP 110. In further embodiments, the delivery area 170 may be an area comprising both circular and polygonal regions. While depicted in FIG. 1 as a contiguous area, in one embodiment, the delivery area 170 may comprises a plurality of disjoint geographic regions.

In certain embodiments, the proximity criteria is user configurable, for example, by the wireless network provider 115. In one embodiment, the proximity criteria is based on a number of social network connections of the wireless network provider 115, wherein the delivery area 170 shrinks as the number of social network connections increases. The proximity criteria to be based on the number of social network connections so as to maintain the number of downloads of access credentials to the mobile devices 125 to a reasonable level. The delivery area 170 may shrink linearly as the number of social network connections increases or may shrink incrementally as the number of social network connections reaches certain thresholds. In another embodiment, the proximity criteria is based on a coverage area 165 of the wireless network, wherein the delivery area 170 extends a user configurable distance beyond the coverage area 165. For example, the delivery area 170 may extend 10 km beyond the coverage area 165.

The guest module 145, in one embodiment, is configured to identify an authorized guest of the wireless network provider 115. In some embodiments, an individual is an authorized guest based on a relationship between the individual and the wireless network provider 115. In one embodiment, the authorized guest is a social network connection of the wireless network provider 115. In another embodiment, the authorized guest is a family member or friend of the wireless network provider 115. In yet another embodiment, the authorized guest is an employee or patron of the wireless network provider 115.

In some embodiments, the guest module 145 filters a plurality of social network connections of the wireless network provider 115 to form a guest list of authorized guests the wireless network provider. The plurality of social network connections may be filtered for particular connection types and/or profile details of the social network connections. As an example, the social networking service may provide for a special connection type for sharing access to a user's wireless access point. In this way, the guest module 145 a distinguish between friends, family members, employees, patrons, customers, or other individuals to whom wireless network service should be provided and other social connections of the wireless network provider 115. For example, the guest module 145 may add individuals to the guest list in response to the individuals "liking" or "following" a business of the wireless network provider.

The guest module 145 may include a linking module 150 and a location module 155. The linking module 150, in one embodiment, is configured to link authorized guests with a wireless AP 110 and/or with a wireless network provider 115. The linking module 150 may be further configured to link one or more mobile devices 125 with an authorized guest, such as a friend, colleague, or family member. The linking module 150 may connect to the linking server 120 and access an account 160 belonging to the wireless network provider 115, wherein the account 160 indicates one or more authorized guests of the wireless network provider 115. In some embodiments, the linking server 120 is a social networking server providing a social networking service.

In some embodiments, the linking module 150 links authorized guests to a wireless network provider 115 by accessing a social network account/profile of the wireless network provider 115. In response to accessing the social network account/profile, the linking module 150 may identify a social network connection of the wireless network provider 115, wherein the social network connection becomes an authorized guest of the wireless network provider 115. For example, the linking module 150 may access a FACEBOOK® profile of the wireless network provider 115 and retrieve (e.g., download) a list of "friends" (social network connections) of the wireless network provider 115.

The location module 155, in one embodiment, is configured to identify a location for each authorized guest. In some embodiments, the location module 155 receives the guest location, either from the guest's mobile device 125 or from a third party. For example, the location module 155 may retrieve a location of a social network connection of the wireless network provider 115 from a social network server In one embodiment, the received guest location is a coarse location, such as a network location to which the mobile device 125 is currently connected (e.g., indicating the mobile device 125 is somewhere within the coverage area of the network). For example, the received guest location may be the location of a cellular network tower serving the mobile device 125. In another embodiment, the received guest location is a fine location, such as a GPS coordinate.

The wireless access point (AP) 110, in one embodiment, is configured to allow wireless devices, such as the mobile devices 125 to connect to the data network 130 via a wireless connection to the wireless AP 110. In some embodiments, the wireless AP 110 provides wireless service (e.g., a wireless network) within a coverage area 165 surrounding the wireless AP 110. Accordingly, the wireless AP 110 may write access to the wireless network to one or more mobile devices 125 within the coverage area 165.

In some embodiments, the wireless AP 110 may provide a WI-FI® network based on any one of the Institute of Electrical and Electronics Engineers (IEEE) 802.11 standards. Alternatively, the wireless network may be a BLUETOOTH® connection. In addition the wireless network may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless network may employ a ZigBee connection based on the IEEE 802 standard. In one embodiment, the wireless network employs a Z-Wave connection as designed by Sigma Designs. Alternatively, the wireless network may employ an ANT and/or ANT+ connection as defined by Dynastream Innovations Inc. of Cochrane, Canada.

The wireless network may include an infrared connection including connections conforming at least to the Infrared Physical Layer Specification (IrPHY) as defined by the Infrared Data Association (IrDA). Alternatively, the wireless network may be a cellular telephone network. All standards and/or connection types include the latest version and revision of the standard and/or connection type as of the filing date of this application.

In some embodiments, the access manager 105 associates a delivery zone 170 with the wireless AP 110. The perimeter of the delivery zone 170 may be a predetermined distance from the wireless AP 110. The delivery zone 170 may be used to determine whether a mobile device 125 is within sufficient proximity to the wireless AP 110, wherein the access manager 105 downloads an access credential for the wireless AP 110 to a mobile device 125 of authorized guest of the wireless network provider 115.

The wireless network provider 115, in one embodiment, provides the wireless AP 110. The wireless AP 110 may be at a residence or place of business of the wireless network provider 115. For example, the wireless AP 110 may provide a home wireless network for the wireless network provider 115. As another example, the wireless AP 110 may provide a business wireless network for the wireless provider 115.

The wireless network provider 115 may grant access to the wireless network of the wireless AP 110 to one or more authorized guests. These authorized guests may be friends, family members, colleagues, employees, patrons, or the like. Conventionally, the wireless network provider 115 must disclose wireless network settings, such as wireless network identifiers and associated passwords, and to each guest visiting the wireless network. This can be tedious and time-consuming.

Further, anytime the wireless network provider 115 changes and if the wireless network settings, such as a password to access the wireless AP 110, the wireless network provider 115 must inform each guest of the updated settings. Accordingly, the wireless network provider 115 may be required to disclose wireless network settings each time a guest visits, regardless of whether the wireless network provider 115 has previously granted access (e.g., disclose the wireless network settings) to the particular guest. Beneficially, the access manager 105 allows a wireless network provider 115 automatically manage access to the wireless AP 110.

In one embodiment, the wireless network provider 115 is associated with a particular mobile device 125, for example a personal laptop computer, tablet computer, or mobile phone. When the wireless network provider 115 changes wireless network settings for the wireless AP 110 (e.g., a network name or password), the wireless network provider may update wireless network access settings for the particular mobile device 125. In some embodiments, the particular mobile device 125 provides the wireless network access settings to the access manager 105.

The linking server 120, in one embodiment, is configured to link a wireless network provider 115 with one or more individuals. These individuals may be authorized guests of the wireless network provider 115. As described above, these authorized guests may be friends, family members, colleagues, employees, patrons, customers, or the like. Linking server 125 maintains an account 160 for the wireless network provider 115. In some embodiments, the linking server 120 is a social networking server, wherein the account 160 is a social networking account of the wireless network provider 115. In other embodiments, the linking server 120 maintains a list of close friends and family members of the wireless network provider 115, a list of employees of the wireless network provider 115, and/or a list of patrons/customers of the wireless network provider 115, said list stored in the account 160 for the wireless network provider 115.

In some embodiments, the linking server 120 maintains the account 160 independently of managing access to a wireless network, wherein the account manager 105 leverages the account 160 to identify authorized guests of the wireless network provider 115. For example, the linking server 120 may be a social networking server providing a social networking service independent of managing access to a wireless network. The access manager 105 may then information in a social networking profile of the account 160 to identify authorized guests of the wireless network provider 115.

The mobile devices 125, in one embodiment, are configured to provide mobile access to the data network 130 via a wireless network. Examples of mobile devices 125 include, but are not limited to, laptop computers, tablet computers, netbooks, notebooks, wearable computers, portable network computers, smart phone, mobile phone, portable digital assistant (PDA), ultra-mobile person computer (UMPC), handheld game console, and the like.

The mobile devices 125 are capable of connecting to the wireless AP 110, for example, if provided with a wireless network name and password. In one embodiment, the mobile device 125 may access and transfer data over a cellular telephone network, wherein the access manager 105 sends the access credential over the cellular telephone network. After receiving the access credential, the mobile device 125 may access the wireless AP 110 and transfer from the cellular telephone network to the wireless network.

A mobile device 125 may be associated with a friend, family member, colleague, employee, patron, or other authorized guest of the wireless network provider 115. Accordingly, the access manager 105 may identify a mobile device 125 associated with an authorized guest of the wireless network provider 115 and provide an access credential to each mobile device 125 of an authorized guest that is within the delivery zone 170 of the wireless AP 110. Using the provided access credential, the authorized guest may then connect his or her mobile device 125 to the wireless AP 110 when within the coverage area 165 of the wireless network.

Figure 2A:
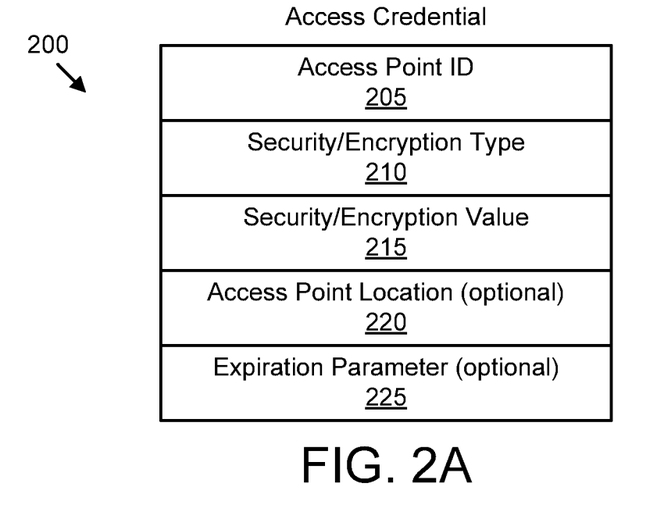
FIG. 2A is a schematic block diagram illustrating one embodiment of an access credential for a wireless network.

FIG. 2A is a schematic block diagram illustrating one embodiment of an access credential 200. The access credential 200 comprises information usable by a mobile device 125 to connect to the wireless access point 110. In some embodiments, the access credential 200 may be organized as a data structure that is communicated from the access manager 105 to a mobile device 125. As depicted, the access credential 200 may include an access point identifier 205, a security/encryption type 210, and a security/encryption value 215.

The access point identifier 205 identifies a wireless AP 110. In some embodiments, the access point identifier 205 includes an access point name. For example, the access point identifier 205 may be a service set identification (SSID) identifying a wireless local area network of the wireless AP 110. In certain embodiments, the access point identifier 205 uniquely identifies the wireless AP 110.

The security/encryption type 210 may indicate a security and/or encryption scheme used by the wireless AP 110. For example, the security/encryption type 210 may specify a wireless security standard supported and/or expected by the wireless AP 110. Similarly, the security/encryption value 215 may contain a value or parameter (complying with the security/encryption type 210) for gaining access to the wireless AP 110. For example, the security/encryption value 215 may be a password used to connect to the wireless AP 110.

The access credential 200 may also include one or more optional fields including: an access point location 220 and an expiration parameter 225. The access point location 220 indicates a geographic location of the wireless AP 110. The expiration parameter 225 indicates a condition wherein the access credential 200 is to be deleted. In one embodiment, the expiration parameter 225 is a time period (e.g., 24 hours) or timestamp, after which the access credential 200 is no longer valid and is to be deleted. In another embodiment, the expiration parameter 225 is a distance from the wireless AP 110, wherein an access credential 200 stored in a mobile device 125 is to be deleted in response to the mobile device 125 traveling beyond the specified distance from the wireless AP 110.

Figure 2B:
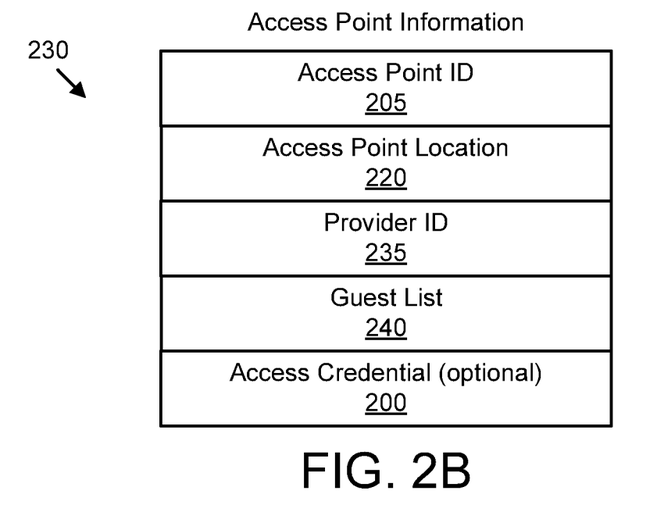
FIG. 2B is a schematic block diagram illustrating one embodiment of access point information for a wireless network.

FIG. 2B is a schematic block diagram illustrating one embodiment of access point information 230. The access point information 230 relates to a particular wireless AP 110. In some embodiments, the access manager 105 stores access point information 230 for each wireless AP 110 managed by the access manager 105. The access point information 230 may be stored at the access manager 105 and/or at the wireless AP 110. In certain embodiments, the access point information 230 may be passed from the wireless AP 110 to the access manager 105.

As depicted, the access point information 230 may include an access point identifier 205, an access point location 220, a provider identifier 235, a guest list 240, and social network account information 245. In some embodiments, the access point information 230 may also include an access credential 200. Where the access point information 230 includes an access credential 200, fields common to both the access point information 230 and the access credential 200 (e.g., access point ID 205 and access point location 220) is not duplicated.

The provider identifier 235 may identify the wireless network provider 115. In one embodiment, the provider identifier 235 may include a legal name of the wireless network provider 115. In another embodiment, the provider identifier 235 may include a username or account number belonging to the network provider 115. In certain embodiments, the provider identifier 235 may identify an electronic device (e.g., a mobile device 125) belonging to the wireless network provider 115, wherein the access point information 230 may be updated with data received from the electronic device.

In some embodiments, the provider identifier 235 includes social network account information (e.g., username and password) for one or more social networking accounts/profiles of the wireless network provider 115. For example, the provider identifier 235 may include all information necessary to access an account 160 belonging to the wireless network provider 115. In one embodiment, the guest module 145 and/or the linking module 150 may use the social network account information in the provider identifier 235 to access a social network profile, identify social network connections, and designate the social network connections as authorized guests the wireless AP 110.

The guest list 240, in one embodiment, includes a plurality of guests authorized to receive an access credential 200 for the wireless AP 110. In one embodiment, the guest list 240 may be cultivated from a social network account of the wireless network provider 115. In another embodiment, the guest list 240 may be cultivated a database of family, friends, employees, or the guests the wireless network provider 115. In some embodiments, the database may be hosted by the wireless AP 110. In other embodiments, the database may be hosted by the wireless network provider 115.

The guest list 240 may be populated by the guest module 145. In some embodiments, the guest module 145 may dynamically update the guest list 240 based on social networking activity of the wireless network provider 115. For example, if the wireless network provider 115 is a business entity and the wireless AP 110 is located at the wireless network provider's 115 place of business, then an individual entering the wireless network provider's 115 place of business may connect with the wireless network provider 115 via a social networking service, wherein the guest module 145 dynamically updates the guest list 240 to include the individual.

In some embodiments, the access manager 105 identifies an authorized guest based on the guest list 240. Accordingly, the access manager 105 may provide an access credential 200 to each individual on the guest list 240 (e.g., download the access credential 200 to an associated mobile device 125) in proximity to the wireless AP 110 (e.g., within the delivery area 170). In the above example, the individual at the wireless network provider's 115 place of business may receive the access credential 200 due to being added to the guest list 240 while within the delivery area 170.

Figure 3A:
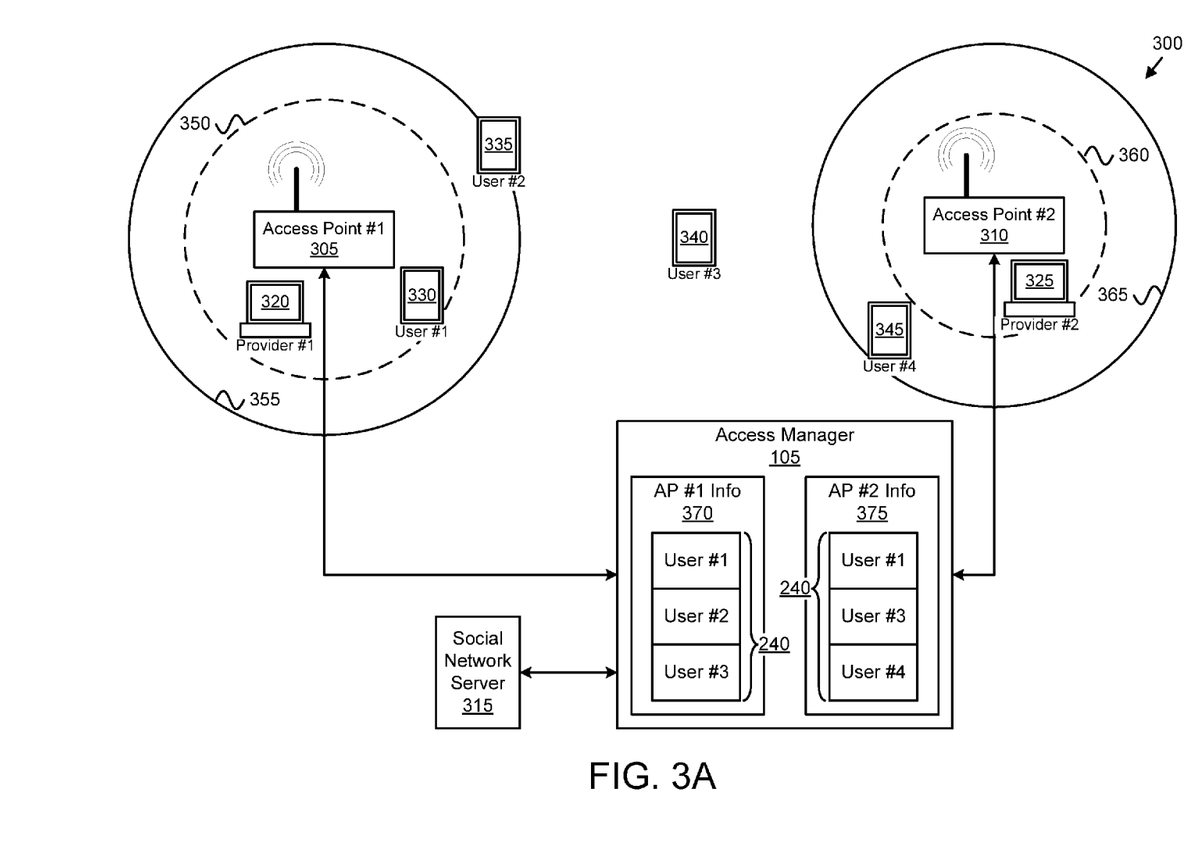
FIG. 3A is a schematic block diagram illustrating one embodiment of a system for managing guest access to a wireless network.

FIG. 3A is a schematic block diagram illustrating one embodiment of an access management system 300 for managing guest access to a wireless network. The access management system 300 includes an access manager 105, a first access point (AP) 305, a second AP 310, a social network server 315, a first wireless network provider 320, a second wireless network provider 325, a first user device 330, a second user device 335, a third user device 340, and a fourth user device 345. The APs 305-310 may be substantially similar to the wireless AP 110 described above, with reference to FIG. 1. The user devices 330-345 may be substantially similar to the mobile devices 125 described above, with reference to FIG. 1.

The access manager 105, in one embodiment, is configured to generate an access credential for a wireless AP 305-310, to identify authorize guests of the wireless network providers 320-325, and to issue the access credential to an authorized guest within a predetermined distance of the wireless AP 305-310. The access manager 105 may be substantially similar to the access manager 105 described above with reference to FIG. 1. In particular the access manager 105 may include a credential module 135, a proximity module 140, and a guest module 145, for automatically providing wireless network access to a guest.

As depicted in FIG. 3A, the access manager 105 may include first access point information 350 and second access point information 355. The access point information 350-355 may include a guest list 240 of authorized guests of a wireless access point. As shown, the first access point information 350 may contain a list 240 of authorized guests of the first wireless access point 305, including the first user 330, the second user 335, and the third user 340. Also as shown, the second access point information 355 may contain a list 240 of authorized guests of the second wireless access point 310, including the first user 330, the third user 340, and the fourth user 345.

In some embodiments, the access point information 350-355 is dynamically updated as information is received from a wireless access point 305-310, a social network server 315, and/or a wireless network provider 320-325. For example, the access manager 105 may regularly access the social network server 315, wherein the guest list 240 may be dynamically updated in response to a wireless network provider 320-325 adding and/or removing a social network connection with a user associated with the user devices 330-345.

The first wireless access point 305, in one embodiment, is configured to provide wireless service to one or more devices within a first coverage area 360 of the first wireless access point 305. In one embodiment, the first wireless access point 305 provides a home wireless network for the first provider device 320 and one or more guests. The first wireless access point 305 may be associated with a first delivery zone 365 extending a predetermined distance from the first wireless access point 305. A mobile device, such as a user device 330-345, within the delivery zone 365 may receive an access credential 200 for the first wireless access point 305, in response to the mobile device being associated with an authorized guest.

Similarly, the second wireless access point 310, in one embodiment, is configured to provide wireless service to one or more devices within a second coverage area 370 of the second wireless access point 310. In one embodiment, the second wireless access point 310 provides a business wireless network for the second provider device 325, employees of the business, and one or more guests of the business. The second wireless access point 310 may be associated with a second delivery zone 375 extending a predetermined distance from the second wireless access point 310. A mobile device, such as a user device 330-345, within the second delivery zone 375 may receive an access credential 200 for the second wireless access point 310, in response to the mobile device being associated with an authorized guest.

The social network server 315 may provide a social networking service one or more users. In some embodiments, the social network server 315 stores a social networking account for each user of the social networking service. The social network server 315 may be accessed by the access manager 105, wherein the access manager 105 identifies social network connections of a provider of a wireless network (e.g., the first wireless access point 305 and/or the second wireless access point 310). For example, a user of the first provider device 320 (e.g., the provider of the first wireless access point 305) may be a user of the social networking service provided by the social network server 315. The user of the first provider device 320 may provide a social networking account name and password to the access manager 105, wherein the access manager 105 accesses the social network server 315 and identifies the social network connections of the user of the first provider device 320.

The first provider device 320, in one embodiment, is an electronic device associated with the provider of the first wireless access point 305. In some embodiments, the first provider device 320 is a mobile device (e.g., a laptop, tablet, or smartphone) that accesses a wireless network provided by the first wireless access point 305. In other embodiments, the first provider device 320 is a stationary device (e.g., a desktop computer) that accesses the wireless network provided by the first wireless access point 305. The user of the first provider device 320 may interact with the access manager 105 for managing access to the first wireless access point 305, for example, for automatically providing an access credential 200 for the first wireless access point 305 to friends, family members, or colleagues visiting the home wireless network.

Similarly, the second provider device 325, in one embodiment, is an electronic device associated with the provider of the second wireless access point 310. The second provider device 325 may be a mobile device or a stationary device that accesses a wireless network provided by the second wireless access point 310. The user of the second provider device 325 may interact with the access manager 105 for managing access to the second wireless access point 310, for example for automatically providing an access credential 200 for the second wireless access point 310 to employees, patrons, and/or customers visiting the business wireless network.

The access manager 105 monitors locations of the user devices 330-345 associated with the guest lists 240 for the first and second wireless access points 305-310. As the first user device 330 enters the first delivery zone 365, the access manager 105 downloads an access credential 200 to the first wireless access point 305 to the first user device 330. Thereafter, as the first user device 330 enters the coverage area 360 of the first wireless access point 305, the first user device 330 may connect to the first access point 305 using the received access credential 200.

As the second user device 335 approaches the first wireless access point 305, the access manager 105 monitors a distance between the second user device 335 and the first wireless access point 305. In response to the distance between the second user device 335 and the first wireless access point 305 being less than a predefined distance (e.g., indicating that the second user device 335 has entered the first delivery zone 365), the access manager 105 downloads, to the second user device 335, an access credential 200 for the first wireless access point 305 due to the second user device 335 being included in the guest list 240 of the first access point information 350. However, as the second user device 335 is not included in the guest list 240 of the second access point information 355, the access manager 105 will not send an access credential 200 for the second wireless access point 310. Thereafter, as the second user device 335 enters the coverage area 360 of the first wireless access point 305, the second user device 335 may connect to the first access point 305 using the received access credential 200.

As the third user device 340 is not within the first delivery zone 365 nor the second delivery zone 375, the access manager 105 will not provide the third user device 340 with an access credential 200. However, as the third user device 340 is included in the guest lists 240 of both the first access point information 350 and the second access point information 355, the access manager 105 will provide an access credential 200 to a corresponding wireless access point in response to the third user device 340 entering the first delivery zone 365 and/or the second delivery zone 375.

As the fourth user device 345 approaches the second wireless access point 310, the access manager 105 monitors a distance between the fourth user device 345 and the second wireless access point 310. In response to the distance between the fourth user device 345 and the second wireless access point 310 being less than a predefined distance (e.g., indicating that the fourth user device 345 has entered the second delivery zone 375), the access manager 105 downloads, to the fourth user device 345, an access credential 200 for the second wireless access point 310 due to the fourth user device 345 being included in the guest list 240 of the second access point information 355. However, as the fourth user device 345 is not included in the guest list 240 of the first access point information 350, the access manager 105 will not send an access credential 200 for the first wireless access point 305. Thereafter, as the fourth user device 345 enters the coverage area 370 of the second wireless access point 310, the fourth user device 345 may connect to the second wireless access point 310 using the received access credential 200.

In some embodiments, the access credentials 200 provided by the access manager 105 include an expiration condition based on distance from the wireless access points 305-310. This may be used to ensure that a user device 330-345 always has an up to date access credential 200 and does not attempt to connect to a wireless access point using outdated access information. For example, the expiration condition may indicate that the access credentials 200 are to be deleted when a user device 330-345 leaves the delivery zones 355 and 365. As another example, the expiration condition may indicate that the access credentials 200 are to be deleted in response to the user devices 330-345 exceeding an expiration distance from the wireless access points 305-310. In other embodiments, the access manager 105 may monitor locations of the user devices 330-345 in relation to the wireless access points 305-310 and send an instruction to a particular user device 330-345 exceeding the expiration distance from the wireless access points 305-310.

Figure 3B:
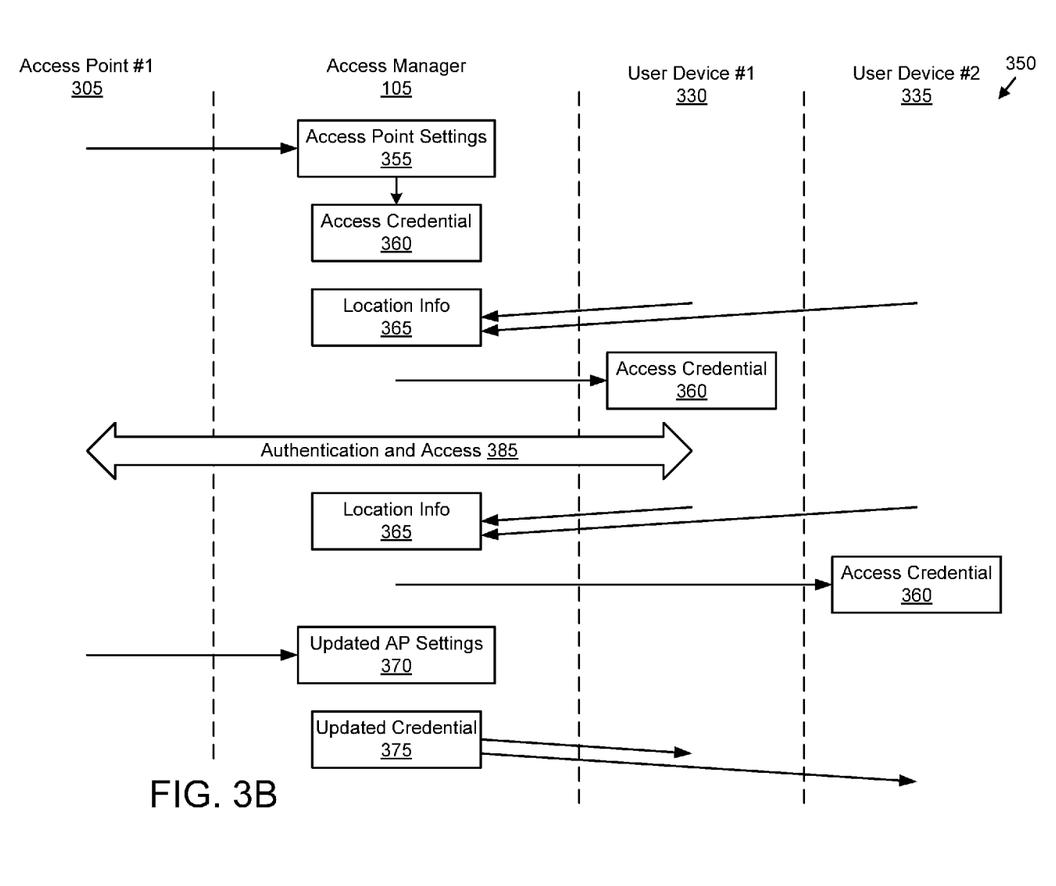
FIG. 3B is a schematic block diagram illustrating data creation and flow in a system for managing guest access to a wireless network.

FIG. 3B is a schematic block diagram illustrating data creation and flow 350 in the access management system 300 for managing guest access to a wireless network. The depicted data creation and flow 350 is between the access manager 105, the first wireless access point (AP) 305, the first user device 330, and the second user device 335.

Initially, the access manager 105 receives access point settings 335 from the first wireless AP 305. Based on the received access point settings 335, the access manager 105 creates an access credential 360. In one embodiment, the access credential 360 substantially similar to the access credential 200 discussed above the reference to FIG. 2A, and includes all information necessary for a user device to connect to the first wireless AP 305.

The access manager 105 periodically receives location information 365 from the first user device 330 and from the second user device 335. In some embodiments, the location information 365 includes course location information, such as ZIP Code information, network location information, or the like. In other embodiments, the location information 365 includes fine location information, such as GPS coordinates or the like. The access manager 105 utilizes location information 365 to determine whether the first user device 330 and/or the second user device 335 are within a predetermined distance of the first wireless AP 305 (e.g., within the delivery zone 355).

In response to determining that the first user device 330 is within the predetermined distance of the first wireless AP 305, the access manager 105 downloads the access credential 360 to the first user device 330. The first user device 330 may then use the access credential 360 to connect to the first wireless AP 305 when the first user device 330 is within the wireless network coverage area 350 of the first wireless AP 305. In some embodiments, connecting to the first wireless AP 305 includes the first user device 330 performing authentication 385 with the first wireless AP 305.

The access manager 105 continues to receive location information 365 from the first user through 30 from the second user 335. In response to determining that the second user 335 is within a predetermined distance of the first wireless AP 305, the access manager 105 downloads the access credential 360 to the second user device 335. The second user device 335 stores the access credential 360 and local memory, and uses the access credential 360 when the second user device 335 is within the wireless network coverage area 350 of the first wireless AP 305.

In some embodiments, the access manager 105 receives updated access point settings 370 from the first wireless AP 305. Based on the updated access point settings 370, the access manager 105 generates an updated access credential 375. As both the first user device 330 and the second user device 3350 are within the predetermined distance of the first wireless AP 305, the access manager 105 downloads the updated credential 375 to both the first user device 330 and the second user device 335.

Figure 4:
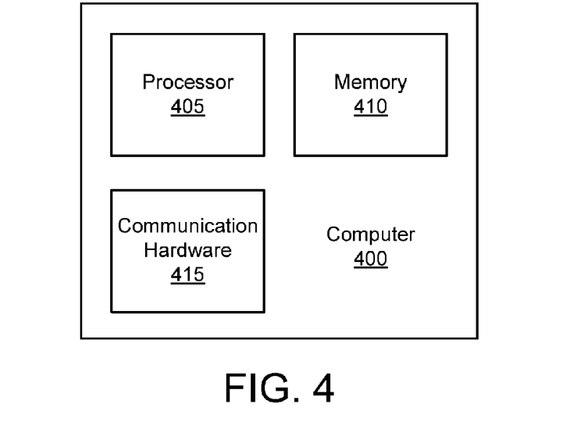
FIG. 4 is a schematic flow chart diagram illustrating one embodiment of a computer for automatically providing wireless network access to a guest.

FIG. 4 is a schematic flow chart diagram illustrating one embodiment of a computer 400 for automatically providing wireless network access to a guest. The computer 400 may be embodied in the access manager 105, the wireless access point 110, the access points 305-310, the linking server 120, and/or the social network server 315. In addition, the computer 400 may be embodied in the mobile device 125, the provider devices 320-325, and/or the user devices 330-345. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. For example, the communication hardware 415 may communicate with the data network 130 and/or the wireless access point (AP) 110.

Figure 5:
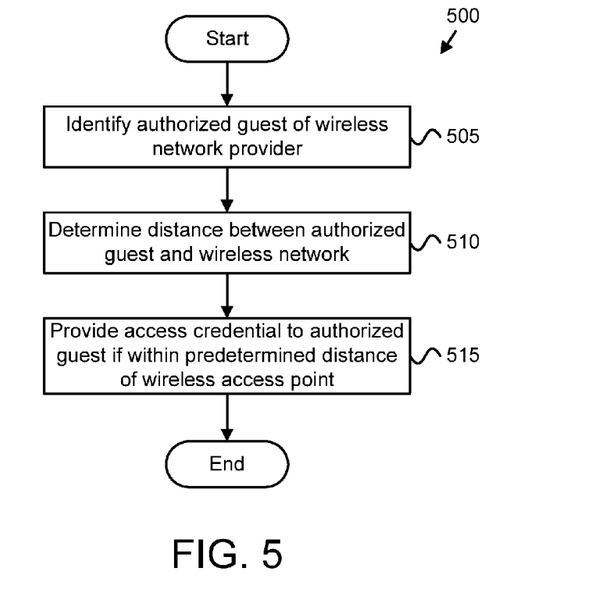
FIG. 5 is a schematic flow chart diagram illustrating one embodiment of a method for automatically providing wireless network access to a guest.

FIG. 5 is a schematic flow chart diagram illustrating one embodiment of a method for automatically providing wireless network access to a guest. In some embodiments, the method 500 is performed by the access manager 105. In one embodiment, the method 500 may be executed by a processor 405. Alternatively, the method 500 may be implemented by a computer readable storage medium such as the memory 410. The computer readable storage medium may store code that is executed on the processor 405 to perform the functions of the method 500.

The method 500 starts and, in one embodiment, the guest module 145 identifies 505 an authorized guest of a provider of a wireless network (e.g., the wireless network provider 115). In some embodiments, the authorized guest is a social network connection of the wireless network provider 110, wherein identifying 505 the authorized guest includes accessing a social networking account of the wireless network provider 110. In other embodiments, the identifying 505 the authorized guest includes accessing a database containing friends, family members, employees, and/or other authorized guests of the wireless network provider 115.

The proximity module 140, in one embodiment, determines 510 a distance between the authorized guest and the wireless network. In some embodiments, determining 510 the distance between the authorized guest and the wireless network includes identifying a location of a mobile device 125 belonging to the authorized guest. Determining 510 the distance between the authorized guest and the wireless network may further include comparing the location of the mobile device 125 to a location of the wireless AP 110 and/or to the coverage area 165 of the wireless network. In other embodiments, determining 510 the distance between the authorized guest and the wireless network includes querying a location server.

The credential module 135, in one embodiment, provides 515 an access credential 200 to the authorized guest in response to the authorized guest being within a predetermined distance of the wireless network (e.g., of the wireless AP 110 and/or of the coverage area 165 of the wireless network). The access credential 200 allows a mobile device 125 of the authorized guest to connect to the wireless AP 110. In some embodiments, the wireless network is a secured wireless network, wherein the access credential 200 includes a wireless network identifier and a password use to connect to the secured wireless network.

The predetermined distance, in one embodiment, defines a delivery area 170, wherein providing 515 an access credential 200 to the authorized guest includes delivering an access credential 200 each authorized guest within the delivery area 170. In some embodiments, the predetermined distance may be user configurable. In certain embodiments, the predetermined distance may be based on a number of social network connections of the wireless access provider 115 and/or on a coverage area 165 of the wireless network. The predetermined distance may be greater than the coverage area 165 of the wireless network. The method 500 ends.

Figure 6:
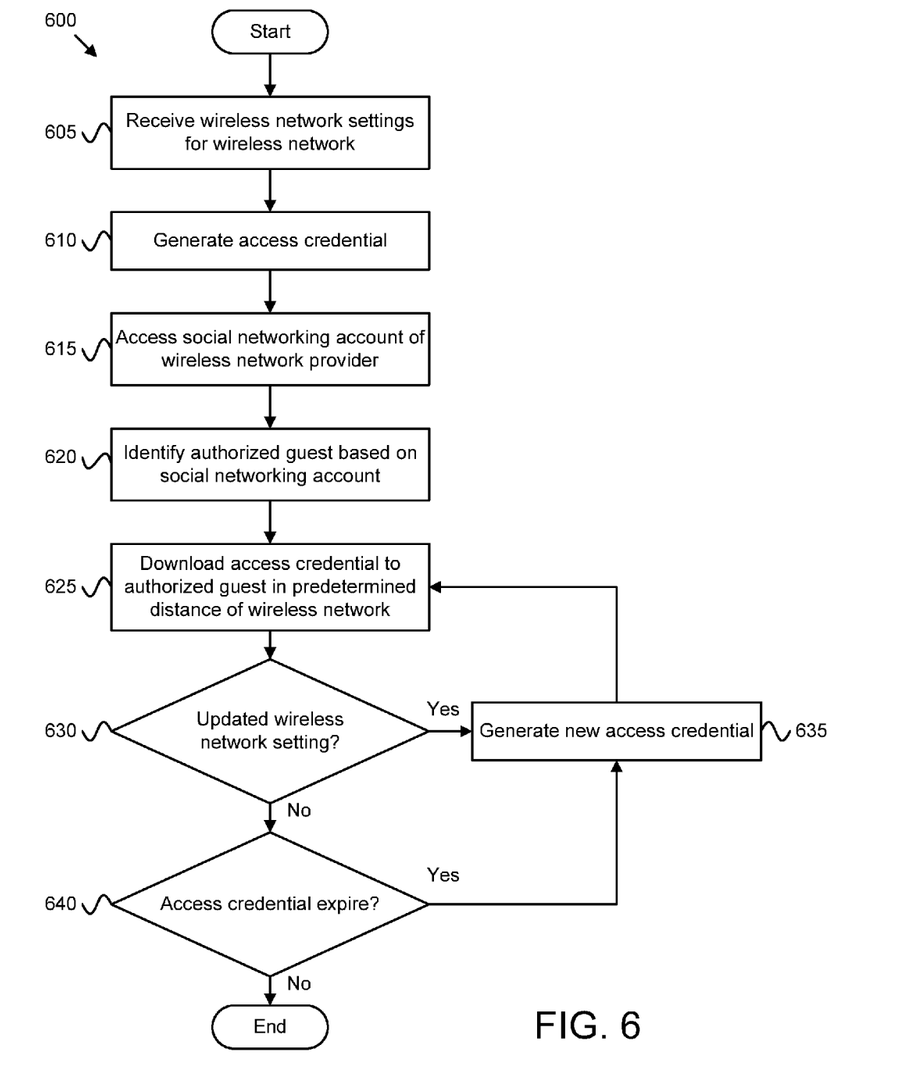
FIG. 6 is a schematic flow chart diagram illustrating another embodiment of a method for automatically providing wireless network access to a guest.

FIG. 6 is a schematic flow chart diagram illustrating another embodiment of a method for automatically providing wireless network access to a guest. In one embodiment, the method 600 is performed by an access manager 105. In another embodiment, the method 600 may be performed by a processor 405. Alternatively, the method 600 may be performed by a computer readable storage medium such as the memory 410. The computer readable storage medium may store code that is executed on the processor 405 to perform the functions of the method 600.

The method 600 starts and, in one embodiment, the credential module 135 receives 605 wireless network settings for a wireless network from provider of the wireless network (e.g., the wireless network provider 115). Based on the received wireless network settings, the credential module 135 generates 610 an access credential, such as the access credential 200. In some embodiments, the access credential includes a wireless network identifier and corresponding password use to connect to a wireless access point (AP) 110.

The guest module 145, in one embodiment, accesses 615 a social networking account of the wireless network provider 115. The guest module 145 then identifies 620 one or more authorized guests from the social networking account. In some embodiments, identifying 620 the one or more authorized guests includes downloading a list of social network connections from the social networking account, wherein the authorized guest is a social network connection of the wireless network provider 115. In further embodiments, the authorized guest is a social network connection having a specific property or connection type.

The proximity module 140, in one embodiment, downloads 625 the access credential (e.g., the access credential 200) to an authorized guest within a predetermined distance of the wireless network. In some embodiments, downloading 625 the access credential to an authorized guest within a predetermined distance includes determining 510 a distance between a mobile device 125 of the authorized guest and the wireless AP 110 and/or to the coverage area 165 of the wireless network. In further embodiments, downloading 625 the access credential includes providing an access credential 200 to each authorized guest within a delivery area 170 defined by the predetermined distance.

The credential module 135, in one embodiment, determines 630 whether updated wireless network settings have been received from the provider of the wireless network. In some embodiments, a mobile device 125 of the wireless network provider 115 automatically sends updated wireless network settings to the access manager 105 and response to the wireless network provider 115 updating said settings for the wireless network. For example, the wireless network may be a home wireless network of the wireless network provider 115. In response to changing the wireless network settings for the home wireless network, the wireless network provider 115 may enter the updated settings into his or her mobile device 125. The mobile device 125 may then automatically send the updated wireless network settings to the access manager 105.

In response to the credential module 135 receiving updated wireless network settings, the credential module 135 generates 635 a new access credential, wherein the proximity module 140 downloads 625 the new access credential to each authorized guest within the predetermined distance of the wireless network. Otherwise, in response to the credential module 135 not receiving updated wireless network settings, the credential module 135 determines 640 whether the access credential 200 has expired.

In some embodiments, the access credential 200 includes an expiration time, wherein the access credential 200 is no longer valid after said expiration time. For example, the access credential 200 may include a temporary wireless network identifier valid for a predetermined time period, such as 24 hours after generation of the access credential 200, wherein the access credential 200 is only valid during the predetermined time period. In another embodiment, the access credential 200 may include an expiration time property field that triggers deletion of the access credential 200 at the expiration time indicated by the expiration time property field.

In response to the credential module 135 determining that the access credential 200 is expired, the credential module 135 generates 635 a new access credential 200 for the wireless network, wherein the proximity module 140 downloads 625 the new access credential 200 to each authorized guest within the predetermined distance of the wireless network. In some embodiments, the new access credential 200 includes a new temporary wireless network identifier. Otherwise, in response to the credential module 135 determining that the access credential 200 has not expired, the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   generate wireless access settings for a wireless access point;
   identify a number of social network connections of a provider of the wireless access point, the provider of the wireless access point having a social networking profile with a social networking service, wherein the social network connections have a relationship with the provider via the social networking service;
   define a delivery area for the wireless access point based on a number of social network connections of the provider and a coverage area of the wireless network, the delivery area being a dynamically configurable area larger than a coverage area of the wireless access point, wherein the delivery area encompasses the coverage area of the wireless access point and extends beyond the coverage area of the wireless access point; and download wireless access settings for the wireless access point to a mobile device of a first social network connection of the provider in response to the mobile device being within the delivery area of the wireless network,
wherein downloading the wireless access settings comprises transmitting the access credential over a second network different than a wireless network provided by the wireless access point,
wherein the wireless access settings comprise an expiration parameter indicating a condition wherein the access credential is to be deleted.

2. The apparatus of claim 1, wherein identifying the number of social network connections of the provider comprises: accessing a social network profile of the provider and downloading a list of social network connections from the social network profile.

3. The apparatus of claim 1, wherein downloading the wireless access settings in response to the mobile device being within a delivery area of the wireless network comprises identifying a geographic location for the social network connection and downloading the wireless access settings in response to the social network connection being within an area a predetermined distance from the wireless access point, wherein the predetermined distance is greater than the coverage range of the wireless access point, wherein the predetermined distance is based on the number of social network connections of the provider.

4. The apparatus of claim 3, wherein identifying the geographic location of the social network connection comprises querying a social network provider for the geographic location of the social network connection.

5. The apparatus of claim 1, wherein generating the wireless access settings comprises:
receiving access point settings from the provider; and
generating wireless access settings for the wireless access point based on the received access point settings.

6. The apparatus of claim 5, wherein generating wireless access settings comprises creating an expiration time property field that triggers deletion of the wireless access settings at a time indicated by the expiration time property field.

7. The apparatus of claim 5, wherein generating wireless access settings comprises creating a temporary wireless network identifier valid for a predetermined time period, the wireless access settings including the temporary wireless network identifier and a password.

8. The apparatus of claim 1, wherein the wireless access settings expire after a predetermined time period, the apparatus further comprising:
code that updates the wireless access settings, in response to expiration of the predetermined time period; and
code that issues the updated wireless access settings to the social network connection.

9. A method comprising:
identifying an authorized guest of a provider of a wireless network;
determining a location of the authorized guest relative to the wireless network;
defining a delivery area for the wireless network with a size based on a number of social network connections of the provider and a coverage area of the wireless network, the provider having a social networking account with a social networking service, wherein the social network connections have a relationship with the provider via the social networking service,
wherein the delivery area is a dynamically configurable area larger than a coverage area of the wireless network, wherein the delivery area encompasses the coverage area of the wireless network and extends beyond the coverage area of the wireless network; and
providing an access credential to the authorized guest in response to the authorized guest being within the delivery area of the wireless network,
wherein providing the access credential to the authorized guest comprises transmitting the access credential over a second network different than the wireless network,
wherein the access credential comprises an expiration parameter indicating a condition wherein the access credential is to be deleted.

10. The method of claim 9, further comprising:
receiving wireless network settings for the wireless network from the provider; and
generating the access credential based on the wireless network settings.

11. The method of claim 9, further comprising:
receiving an updated access credential for the wireless network from the provider;
generating a new access credential based on the received updated access credential; and
providing the new access credential to each authorized guest within the delivery area of the wireless network.

12. The method of claim 9, wherein identifying the authorized guest of the provider comprises:
accessing the social networking account of the provider; and
identifying a social network connection of the provider from the social networking account, wherein the authorized guest is the social network connection of the provider.

13. The method of claim 9, wherein identifying an authorized guest of the provider comprises accessing a list of authorized guests, and wherein determining the location of the authorized guest relative to the wireless network comprises querying a location server for the geographic location of the authorized guest.

14. The method of claim 9, wherein the wireless network is a secured wireless network, and wherein the access credential comprises a wireless network identifier and a password for the secured wireless network.

15. The method of claim 9, wherein the delivery area shrinks as the number of social network connections of the provider increases.

16. The method of claim 9, wherein the wireless network is a wireless local area network and the second network is a cellular telephone network.

17. A program product comprising a computer readable storage medium that is not a transitory signal and that stores code executable by a processor, the executable code comprising code to perform:
generating an access credential for a wireless network;
identifying an authorized guest of a provider of the wireless network;
determining a location of the authorized guest relative to the wireless network;
defining a delivery area for the wireless network based on a number of social network connections of the provider and a coverage area of the wireless network, the provider having a social networking account with a social networking service, wherein the social network connections have a relationship with the provider via the social networking service,
wherein the delivery area is a dynamically configurable area larger than a coverage area of the wireless network, wherein the delivery area encompasses the coverage area of the wireless network and extends beyond the coverage area of the wireless network; and issuing the access credential to the authorized guest in response to the authorized guest being within the delivery area of the wireless network, wherein issuing the access credential to the authorized guest comprises transmitting the access credential over a second network different than the wireless network, wherein the access credential comprises an expiration parameter indicating a condition wherein the access credential is to be deleted.

18. The program product of claim 17, wherein generating the access credential for the wireless network comprises receiving login information for the wireless network from the provider.

19. The program product of claim 17, wherein identifying an authorized guest of the provider comprises:

accessing a social networking account of the provider; and identifying a social network connection of the provider from the social networking account, wherein the authorized guest is the social network connection of the provider.

20. The program product of claim 17, wherein the wireless network is a secured wireless network, and wherein the access credential comprises a wireless network identifier and a password for the secured wireless network.

* * * * *